United States Patent Office 3,464,968

Patented Sept. 2, 1969

3,464,968

THREE-COMPONENT CATALYST FOR THE POLYMERIZATION OF OLEFINS

Helmut Hoegl, Geneva, Switzerland, Götz Rotta, Mannheim-Lindenhof, Germany, and Alfred Columberg, Geneva, Switzerland, assignors to Solvay & Cie, Brussels, Belgium No Drawing. Filed Dec. 10, 1965, Ser. No. 513,074
Claims priority, application France, Dec. 24, 1964, 999,982
Int. Cl. C08f *1/34*
U.S. Cl. 260—94.9 27 Claims

ABSTRACT OF THE DISCLOSURE

A minute proportion of a compound of a transition element is all that is required in combination with a quinone/phenolic complex and an organometallic compound to produce a highly active and effective catalyst system for all olefins.

The present invention relates to a process for the polymerization and the copolymerization of olefins and a new catalyst therefor, and, in particular, to the polymerization and the copolymerization of ethylene under a low pressure.

A very large number of catalysts are used for the polymerization of olefins under low pressure. Certain of these, generally called "Ziegler catalysts" comprise a combination of a halide, or of an acetyl acetonate of a transition element taken from Groups IV–B, V–B and VI–B of the Periodic Table (C. D. Hodgman, Handbook of Chemistry and Physics, 43rd edition, p. 448) with an organometallic compound of a metal from Groups II and III (Belgian Patents Nos. 533,762; 534,792; and 534,888).

All of these catalysts contain relatively large quantities of transition element compounds which exert an extremely unfavorable influence on the color and the stability of the polymers made therewith. The resulting polymers must, therefore, be more highly refined, the degree of refining increasing with the increased content of the transition elements. Consequently, it is particularly desirable to reduce as much as possible the quantity of transition element compounds used in the catalyst.

It is, therefore, a principal object of this invention to provide an improved catalyst for the polymerization of olefins and copolymers thereof.

It is another object of this invention to provide an improved olefin polymerization catalyst containing relatively small amounts of compounds of the transition elements.

It is still another object of this invention to provide a process of producing highly linear polyolefins, and the resulting product.

These and other objects and advantages of the invention will become apparent from the description and claims appended hereto.

It was surprisingly found that all olefins, and in particular ethylene, can be polymerized with a highly active and effective catalyst system containing only traces of the transition elements. This catalyst has, as its base, a complex of a quinone and a phenolic compound. The extremely high activity of these catalysts is indeed surprising inasmuch as quinone, phenolic compounds, and complexes thereof are well-known polymerization inhibitors.

According to the invention, the polymerization of olefins, and in particular of ethylene, is effectuated in the presence of a catalyst system comprising:

(a) An organic complex formed from a quinone and a phenolic compound;

(b) An organometallic compound of e.g., one of the formulae:

$$R_3, M, R_2MH, RMH_2 \text{ and } R_2MX$$

wherein each R is a hydrocarbon radical containing 1 to 12 carbon atoms and selected from the group consisting of alkyl, cycloalkyl, aryl, alkylaryl, and aralkyl, M is a metal from Group III–A of the Periodic Table, and X is a halogen selected from the group consisting of fluorine, chlorine, bromine and iodine; and (c) Trace amounts of a compound of a transition element belonging to Groups IV–B, V–B and VI–B of the Periodic Table of elements.

The catalytic materials formed from quinones and phenolic compounds, which constitute the principal catalyst constituent, are molecular complexes of the quinhydrone type. The mechanism of the catalytic action of these complexes is unknown. It is known, however, that it is necessary that these complexes belong to the category of complexes by charge transfer. They comprise a quinonoid constituent Q, an electron acceptor, and a phenolic constituent P, an electron donor. Their composition varies according to the number of aromatic ring assemblies and the number of hydroxyl groups carried thereon. Preferably, the phenol contains 1 to 5 aromatic rings and 1 to 2 hydroxyl groups thereon.

These rings can also have attached thereto 1 to 4 substituents selected from the group of alkyl, cycloalkyl, aryl, alkylaryl and aralkyl having preferably 1 to 12 carbon atoms.

When dihydric phenol is used, the stoichiometric composition of the complex is QP. On the other hand, if the phenolic constituent is monohydric phenol, the stoichiometric composition of the complex is $QP_2$.

As a practical matter, all of the quinones are suitable for the preparation of the catalytic complexes, although it is preferable to use quinones having preferably 1 to 5 ring assemblies. Notably, benzoquinone, naphthaquinone, anthraquinone, phenanthraquinone, perylenequinone, diphenoquinone, as well as their substituted derivatives, and particularly the halogenoquinones, such as tetrachloroquinone, are suitable. The quinones may also have substituted on the ring alkyl, aryl, alkylaryl and/or aralkyl groups such as methyl, ethyl, tert.butyl, phenyl, etc. Other suitable examples of the substituted quinones are dichloronaphthoquinone, methylnaphthoquinone, methylbromonaphthoquinone, phenylbezoquinone. Excellent results are especially obtained with benzoquinone.

Insofar as concerns the phenolic compounds, they are chosen from the group comprising dihydric phenols and the monohydric phenols. When monohydric phenols are employed, it is preferable to use phenol, the cresols, and naphthol.

Preferably, the dihydric phenols are used for the preparation of the catalytic complexes. Examples of dihydric phenols producing exceedingly active complexes are hydroquinone and the derivatives thereof, notably mono- and polyalkylhydro-quinones wherein the alkyl group contains preferably 1 to 12, more preferably 1 to 4 carbon atoms. Resorcinol and pyrocatechol, as well as the polycyclic dihydroxy phenols, are also suitable. Other phenols suitable for use herein are hydroxypyrene, dihydroxyanthracene, dihydroxynaphthalene, dihydroxyperylene, dihydroxypyrene.

A particularly interesting catalytic complex, because of its high activity and its ready availability, is quinhydrone itself. Its formula is QP, Q being in this case the benzoquinone and P the hydroquinone.

The organometallic compounds having the metal portion thereof selected from Group III–A of the Periodic Table of elements contain, as the organo portion, a hydrocarbon radical containing 1 to 12 carbon atoms and selected from the group consisting of alkyl, cycloalkyl, aryl, alkylaryl and arylkyl.

The organometallic compounds are preferably chosen from among the derivatives of boron and aluminum. The preferred organoaluminum compounds are the trialkyl aluminum compounds and the organoaluminum halides and hydrides.

In the case of the trialkyl aluminum compounds each alkyl contains preferably 1 to 12, and more preferably 1 to 6 carbon atoms. Suitable alkyl aluminum compounds for use herein are: trimethylaluminum, triethylaluminum, tripropylaluminum, triisobutylaluminum, tricyclohexylaluminum, trioctylaluminum, tridodecylaluminum.

The organometallic halides, preferably, contain as the halogen 1 atom of fluorine, chlorine, bromine or iodine, and as the organo portion an alkyl, cycloalkyl, aryl, alkylaryl and aralkyl containing preferably 1 to 12, more preferbly 1 to 6 carbon atoms. It is preferable to use alkylaluminum halides of the group consisting of dimethylaluminum chloride, diethylaluminum chloride and ethylaluminum sesquichloride. Also suitable are diethylaluminum bromide, dipropylaluminum fluoride, diisobutylaluminum fluoride, dimethylaluminum iodide, diethylaluminum iodide, etc.

The organoaluminum hydrides contain 1 to 2 hydrogen atoms and as the organo portion an alkyl, cycloalkyl, aryl, alkylaryl and aralkyl contining 1 to 12, more preferably 1 to 6 carbon atoms. Examples of such compounds are diethylaluminum hydride, ethylaluminum dihydride, diisobutylaluminum hydride, etc.

The organoboron compounds preferably contain as the organo portion an alkyl, cycloalykl, aryl, alkylaryl or aralkyl containing preferably 1 to 12, more preferably 1 to 6 carbon atoms. Preferred examples of the organoboron compounds are trimethylboron, triethylboron, dimethylboron hydride, diethylboron hydride, methylboron dihydride, ethylboron dihydride, diethylboron chloride.

The organic and inorganic compounds containing transition elements of chromium, molybdenum, vanadium, titanium and zirconium are particularly effective in the catalyst system of the present polymerization process. The transition metals are present combined with anions preferably selected from chloride, bromide, iodide, oxychloride, acetate, acetylacetonate, acetoacetate, and alkoxides such as ethoxide, isopropoxide and butoxide.

These elements are preferably present in a valence state which is lower than the maximum. Chromium III acetate, vanadium III chloride, and vanadium IV chloride have been found to be particularly effective.

The compounds containing the transition element are to be present in the catalyst system in very small amounts, existing practically as traces. The mol ratios of these compounds to one or the other of the catalyst constituents are generally between $1/50,000$ and $1/100$. It is particularly surprising that the transition element compound present in an amount lower than $1/100,000$ by weight of the catalyst system is sufficient to effectuate the polymerization of the olefins in high yields.

The mol ratio of the other two constituents of the catalyst, viz., the mol ratio of the organometallic compound to the organic complex, is preferably chosen to be equal to, or greater than, 1. In practice, values of between 1 and 5 are very suitable. The mol ratio of these constituents is generally tailored to the characteristics of the monomer to be polymerized, the particular conditions of the test, and the desired properties of the resulting polymer.

Quantities of the organic complex as small as 0.001 mol and 0.001 to 0.005 mol of the organometallic compound are sufficient for effectuating the polymerization of 1 mol of olefin. However, it is preferred to utilize larger quantities of the catalyst in most cases; 0.005 to 0.05 mol of organic complex and 0.005 to 0.25 mol of organometallic compound and 0.00005 to 0.0001 mol of the transition element compound are highly suitable to completely polymerize 2 mols of olefins.

The mixture of the various constituents of the catalyst can be effected in any known manner and, in particular, in a separate receptacle, such as a ball mill, or else directly in the polymerization autoclave. In general, it is preferred to introduce the organometallic compound directly into the polymerization autoclave in order to avoid any contact and contamination thereof with oxygen and humidity in the air.

The new catalysts are very suitable for the polymerization and the copolymerization of olefins and produce solid olefin polymers having high molecular weights. It is particularly advantageous to polymerize with this catalyst system olefins selected from ethylene, propylene, butene and higher $\alpha$ olefins. These olefins may be homopolymerized or copolymerized.

Polymers produced by the present process have extremely low ash concentrations due to the high activity of the catalyst and they are practically free of the noxious compounds containing transition elements since these compounds are only present in the catalyst in trace amounts. The process steps usually required to purify and remove the noxious compounds from the polyolefins are thus no longer necessary, and are at least greatly simplified, when improved catalysts of the present invention are used.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Examples

Table I below shows the operating conditions and yields of the polymer produced in a series of tests conducted in the following manner:

To an autoclave which has been rigorously dried and purged several times with pure nitrogen, 100 ml. of pure, dry benzene is added, as well as catalysts whose constituents and quantities are specified in the table.

The indicated operating temperature is maintained during the polymerization and the ethylene is introduced, under pressure, into the autoclave.

The reaction is halted after the period of time mentioned in the table, and the resulting polyethylene is separated, then dried, and weighed.

TABLE I

| | | | Ethylene | | Organometallic component | | | | | | Polyethylene obtained | |
|---|---|---|---|---|---|---|---|---|---|---|---|---|
| | | | | | Organic complex=a | | | Compound containing transition element | | | | |
| Test No. | Temp., ° C. | Duration, h. | Quantity, g. | Pressure, max. atm. | Nature | millimoles | $Al(C_2H_5)_2Cl$ =b, millimoles | Nature | Mg. | millimoles | G. | Percent of yield |
| Ref. A | 20 | 48 | 14 | 12 | ------------ | | 60 | $Cr(O_2CCH_3)_3$ | 13.7 | 0.06 | 0.05 | 0.3 |
| Ref. B | 20 | 20 | 40 | 30 | Benzoquinone | 10 | 60 | $Cr(O_2CCH_3)_3$ | 19.7 | 0.09 | 0.8 | 2.0 |
| Ref. C | 20 | 20 | 40 | 30 | Hydroquinone | 10 | 60 | $Cr(O_2CCH_3)_3$ | 28.2 | 0.12 | 0.2 | 0.5 |
| 1 | 20 | 24 | 42 | 12 | Quinhydrone | 20 | 60 | $Cr(O_2CCH_3)_3$ | 11.5 | 0.05 | 42 | 100 |
| 2 | 15 | 24 | 46 | 12 | do | 20 | 60 | $Cr(O_2CCH_3)_3$ | 13.2 | 0.06 | 46 | 100 |
| 3 | 20 | 24 | 55 | 12 | do | 20 | 60 | $Cr(O_2CCH_3)_3$ | 17.6 | 0.08 | 55 | 100 |
| 4 [1] | 20 | 3 | 35 | 25 | do | 20 | 60 | $VCl_4$ | 11.6 | 0.06 | 32 | 91 |
| 5 | 20 | 24 | 35 | 30 | do | 20 | 60 | $VCl_3$ | 0.22 | 0.0014 | 7.8 | 22 |

[1] In this run the benzene was replaced by heptane as a diluent.

The results shown in the above table clearly demonstrate that polyethylene in excellent yields and most often in large quantities is furnished by the catalysts of the present invetion (Tests 1 to 5).

It may also be noted that the quantities of transition element compounds utilized are always very small. Usually 10 mg. (less than 1 millimol for 1,000 millimols of catalyst) are amply sufficient, and even quantities as small as 0.2 milligram (1 millimol for 50,000 millimols of catalyst) still produce good results.

On the other hand, the tests designated by references A, B, and C in Table I show that the yields are very small when the polymerization is conducted without the organic complex. Thus, the three constituents of the catalyst system are essential and indispensible.

The tests designated by references B and C demonstrate that it is indeed the complex between a quinone and an arylhydroxide which is responsible for the high catalytic activity and not merely one of the catalytic components individually.

In addition, an examination of the produced polyethylenes shows that they are highly linear, crystalline, and their fusion temperatures (determined by differential thermal analysis) are between 138 and 142° C. The relative viscosities of the polymers, measured at a concentration of 0.1 gram for each gram of tetraline at 160° C., are between 1.131 and 1.244, corresponding to molecular weights of 310,000 and 520,000, respectively.

Analysis of the polyethylene samples by infrared spectrometry reveals that they contain, for 1,000 carbon atoms, 0.00 $CH_3$ groups, 0.00 to 0.05 vinyl groups, 0.00 to 0.02 vinylidene groups, and 0.00 to 0.05 trans-internal double bonds.

It will be unaerstood that the above description of the present invention is susceptible to various modifications, changes, and adaptations, and the same are intended to be comprehended within the meaning and range of equivalents of the appended claims.

What is claimed is:

1. A process which comprises polymerizing an olefin in the presence of a polymerization catalyst system comprising:

(a) an organic complex of a quinone and a phenolic compound;

(b) an organometallic compound selected from the ground consisting of a compound of a metal M wherein each valence thereof is bonded to an organic radical R, a compound of a metal M wherein at least one valence thereof is bonded to an organic radical R and each of from one to two valences thereof is bonded to a hydrogen atom, all of the valences thereof being bonded to either the organic radical or a hydrogen atom, and a compound of a metal M wherein at least one valence thereof is bonded to an organic radical R and at least one valence thereof is bonded to a halogen X, all of the valences thereof being bonded to either the organic radical of the halogen, wherein each R is a member selected from the group consisting of alkyl, cycloalkyl, aryl, alkylaryl and aralkyl, M is a metal from Group III–A of the Periodic Table of elements, and X is a halogen selected from the group consisting of fluorine, chlorine, bromine and iodine; and (c) at least a trace amount of a compound of a transition element selected from Groups IV–B, V–B and VI–B of the Periodic Table of elements.

2. Process according to claim 1, wherein the organic complex is formed of a quinone and a phenolic compound selected from the group consisting of monohydric phenol and dihydroxy phenol.

3. Process according to claim 1, wherein the complex of a quinone and phenolic compound is quinhydrone

4. Process according to claim 1, wherein the compound of a transition element contains a metal thereof selected from the group consisting of chromium, molybdenum, vanadium, titanium and zirconium.

5. Process according to claim 1, wherein the compound of a transition element is chromium III acetate.

6. Process according to claim 1, wherein the compound of a transition element is a halide of vanadium.

7. Process according to claim 1, wherein the mol ratio of the compound of a transition element to one of components (a) and (b) of the catalyst system is between $1/50,000$ and $1/100$.

8. A process according to claim 1 wherein the quinone of the organic complex contains from 1 to 5 rings and the phenolic compound thereof comprises 1 to 5 aromatic rings having therein 1 to 2 hydroxyl groups and 1 to 4 substituents selected from the group consisting of alkyl, cycloalkyl, aryl, alkylaryl and aralkyl containing 1 to 12 carbon atoms; each R is a hydrocarbon radical containing from 1 to 12 carbon atoms; and the compound of a transition element contains an anion portion selected from the group consisting of chloride, bromide, iodide, oxychloride, acetate, acetylacetonate, acetoacetate and alkoxide.

9. The process of claim 8, wherein the quinone is selected from the group consisting of benzoquinone, naphthaquinone, anthraquinone, phenanthraquinone, and tetrachloroquinone.

10. A process according to claim 8 wherein the molar ratio of (a):(b):(c) is 1:1 to 5:0.00002 to 0.01.

11. The process of claim 8, wherein the phenolic compound is selected from the group consisting of phenol, cresol, naphthol, resorcinol and pyrocatechol.

12. The process of claim 8, wherein the organic complex contains a quinone selected from the group consisting of benzoquinone, naphthaquinone, anthraquinone, phenanthraquinone and tetrachloroquinone, and a phenolic compound selected from the group consisting of phenol, cresol, naphthol, resorcinol and pyrocatechol.

13. The process of claim 8, wherein the organometallic compound contains a metallic constituent selected from the group consisting of aluminum and boron.

14. The process of claim 13, wherein R is selected from the group consisting of methyl, ethyl, propyl and isobutyl.

15. The process of claim 8, wherein X is chlorine.

16. The process of claim 8, wherein the transition element is selected from the group consisting of chromium, molybdenum, vanadium, titanium and zirconium.

17. The process of claim 8, wherein the transition element compound is chromium III acetate.

18. The process of claim 8, wherein the transition element compound is vanadium tetrachloride.

19. The process of claim 8, wherein the transition element compound is vanadium trichloride.

20. The process of claim 1, wherein the olefin is selected from the group consisting of ethylene, propylene, butene, pentene and hexene.

21. The process of claim 1, wherein the olefin is ethylene.

22. The process of claim 8, wherein the olefin is ethylene.

23. The process of claim 8, wherein the mol ratio of the compound of a transition element to one of components (a) and (b) of the catalyst system is between $1/50,000$ and $1/100$.

24. The process of claim 8, wherein the mol ratio of the organometallic compound to the organic complex is from 1 to 5.

25. A composition comprising:

(a) an organic complex of a quinone and a phenolic compound;

(b) an organometallic compound selected from the group consisting of a compound of a metal M wherein each valence thereof is bonded to an organic radical R, a compound of a metal M wherein at least one valence thereof is bonded to an organic radical R and each of from one to two valences thereof is bonded to a hydrogen atom, all of the valences thereof being bonded to either the organic radical or a hydrogen atom, and a compound of a metal M wherein at least one valence thereof is bonded to an organic radical R and at least one valence thereof is bonded to a halogen X, all of the valences thereof being bonded to either the organic radical or the halogen, wherein each R is a hydrocarbon radical containing 1 to 12 carbon atoms and selected from the group consisting of alkyl, cycloalkyl, aryl, alkylaryl and aralkyl, M is a metal from Group III–A of the Periodic Table of elements, and X is a halogen selected from the group consisting of fluorine, chlorine, bromine and iodine; and (c) at least a trace amount of a compound of a transition element selected from Groups IV–B, V–B and VI–B of the Periodic Table of elements.

26. A composition according to claim 25 wherein the quinone of the organic complex contains 1 to 5 rings and the phenolic compound thereof comprises from 1 to 5 aromatic rings having therein 1 to 2 hydroxyl groups and 1 to 4 substituents selected from the group consisting of alkyl, cycloalkyl, aryl, alkylaryl and aralkyl containing from 1 to 12 carbon atoms; and the compound of a transition element contains an anion portion selected from the group consisting of chloride, bromide, iodide, oxychloride, acetate, acetylacetonate, acetoacetate and alkoxide.

27. A composition according to claim 25 wherein the molar ratio of (a):(b):(c) is 1:1 to 5:0.00002 to 0.01.

References Cited

UNITED STATES PATENTS

| | | | |
|---|---|---|---|
| 3,009,908 | 11/1961 | Andersen | 260—94.9 |
| 3,236,824 | 2/1966 | Wilhjelm | 260—88.2 |
| 3,219,648 | 11/1965 | Hill | 260—93.7 |
| 3,150,122 | 9/1964 | Andersen et al. | 260—94.9 |
| 3,116,274 | 12/1963 | Boehm et al. | 260—94.9 |
| 3,100,764 | 8/1963 | Jezl et al. | 260—93.7 |

JOSEPH L. SCHOFER, Primary Examiner

S. M. LEVIN, Assistant Examiner

U.S. Cl. X.R.

252—429, 431; 260—88.2, 93.7